(12) United States Patent
Kraemer et al.

(10) Patent No.: US 9,329,380 B2
(45) Date of Patent: May 3, 2016

(54) REFLECTIVE DYNAMIC COLOR DEVICE

(71) Applicant: K.A. Advertising Solutions Ltd., Yokneam Ilit (IL)

(72) Inventors: Arnon Kraemer, Zikhron-Yaakov (IL); Tal Carmon, Kiryat-Ata (IL)

(73) Assignee: K.A. Advertising Solutions Ltd., Yokneam Ilit (IL)

( * ) Notice: Subject to any disclaimer, the term of this patent is extended or adjusted under 35 U.S.C. 154(b) by 422 days.

(21) Appl. No.: 13/848,589

(22) Filed: Mar. 21, 2013

(65) Prior Publication Data

US 2013/0258442 A1 Oct. 3, 2013

Related U.S. Application Data

(60) Provisional application No. 61/616,075, filed on Mar. 27, 2012.

(51) Int. Cl.
  *G02B 26/00* (2006.01)
  *G09F 9/37* (2006.01)

(52) U.S. Cl.
  CPC ............... *G02B 26/007* (2013.01); *G09F 9/37* (2013.01); *G09F 9/377* (2013.01)

(58) Field of Classification Search
  CPC ............................ G02F 1/167; G02B 26/005
  See application file for complete search history.

(56) References Cited

U.S. PATENT DOCUMENTS

| | | | | |
|---|---|---|---|---|
| 2006/0245062 A1* | 11/2006 | Gardner et al. | ............... | 359/619 |
| 2008/0100565 A1* | 5/2008 | Song et al. | .................... | 345/107 |
| 2008/0278798 A1* | 11/2008 | Hagood et al. | ................ | 359/298 |
| 2009/0007177 A1* | 1/2009 | Islam | ............................... | 725/39 |
| 2009/0021823 A1* | 1/2009 | Heim et al. | .................... | 359/290 |
| 2010/0321760 A1* | 12/2010 | Hayes et al. | .................. | 359/290 |

FOREIGN PATENT DOCUMENTS

| | | | |
|---|---|---|---|
| CA | 1302083 | A * | 5/1992 |
| CA | 1302083 | | 6/1992 |
| GB | 1210412 | | 10/1970 |
| GB | 2317490 | | 3/1998 |
| GB | 2351381 | | 12/2000 |
| WO | WO 2013/144956 | | 10/2013 |

OTHER PUBLICATIONS

International Search Report of PCT Application No. PCT/IL2013/050276 mailed on Jun. 28, 2013.
International Preliminary Report on Patentability Dated Oct. 1, 2014 From the International Bureau of WIPO Re. Application No. PCT/IL2013/050276.

* cited by examiner

*Primary Examiner* — Bumsuk Won
*Assistant Examiner* — Tamara Y Washington

(57) ABSTRACT

Embodiments of the present invention relate to a display board including a plurality of display devices or tiles that include a casing and a plurality of light manipulating elements disposed within and along a side of the casing, such that the one or more light manipulating elements are adapted to form at least one pixel. The display device or tile further includes at least one or more rods coupled to the plurality of one or more light manipulating elements, and a liquid disposed within the casing, wherein the liquid is adapted to flow within the casing for imparting motion onto the one or more rods for changing the pigment of the at least one pixel.

25 Claims, 9 Drawing Sheets

REFLECTIVE DYNAMIC COLOR DEVICE

CROSS REFERENCE TO RELATED APPLICATIONS

This application claims the benefit of U.S. Provisional Application Ser. No. 61/616,075, filed on Mar. 27, 2012 and entitled REFLECTIVE DYNAMIC COLOR DEVICE, which is incorporated in its entirety herein by reference.

BACKGROUND

1. Technical Field

The present invention relates to color display devices or tiles used in outdoor and/or indoor walls, in the design and advertising market. Particularly, the present invention relates to electro-mechanical reflective systems used for displaying pixels in outdoor and indoor boards, such as in billboards, dynamic walls, mosaics, floors and/or other artistic array displayable in private or public settings, such as homes, museums, restaurants, bars and so forth, having varying sizes and/or varying tiles making up the boards.

2. Discussion of the Related Art

Information boards can be used as part of mass advertising, normally employed by numerous companies, agencies and even individuals, such as those wishing to disseminate promotional and/or advertizing information regarding products and services or any general information those companies believe may attract the attention of the general public. Many advertizing entities may use various venues for gaining exposure in achieving the aforementioned goals. Often companies can gain significant advantage by posting advertizing material on advertizing boards, such as billboards and other large display devices. Such information boards are generally located along road sides, shopping malls and shopping areas, major traffic intersections, and/or other public settings, usually offering the public a wide view of the advertising material, as it pertains to the particular products and/or services those companies offer.

Although popular and effective in providing an advertizing platform, updating the advertizing material posted on the information board can offer a significant logistical challenge, especially when the content posted on the board is changed or is modified very frequently. Hence, to the extent a particular billboard may accommodate numerous vendors in short periods of time can further complicate operation and maintenance of the board. In addition, conventional boards may be limited in that those can display only certain type of information. Further, such boards are usually difficult to maintain and require continuous and dedicated staff for updating and ensuring the boards are aesthetically displayed. Accordingly, currently used boards may be formed, maintained or used in a manner that could be harsh on the environment. Indeed, when such boards are disposed of at the end of their life cycle, harsh materials from which the boards are made can severely pollute the environment through their decomposition. In addition, boards utilizing light emitting diodes (LEDs), such as those emitting white light, may do so at intensities that could be objectionable or even harmful to a human eye.

Further, information boards, similar to those described may be used in settings as part of has become to be known as experience design, that is, a practice of designing products, processes, services, events, and environments, not necessarily as a promotional tool but rather as an artistic element placing focus on the quality of a user's experience and as part of culturally relevant solution. Hence, the emerging discipline of experience design draws from many other disciplines including cognitive psychology and perceptual psychology, linguistics, cognitive science, architecture and environmental design, haptics, hazard analysis, product design, theatre, information design, information architecture, ethnography, brand strategy, interaction design, service design, storytelling, heuristics, technical communication and design thinking. While information boards may be used in the aforementioned settings those, nevertheless, may suffer from the above technical shortcomings, thereby further limiting the artistic and expressional value of ideas, expressions conveyed through the used of the information board.

SUMMARY OF THE INVENTION

Exemplary embodiments of the present technique disclose a display board adapted for displaying various images and graphical illustrations and outputs, such as those used in advertisements and promotional content. More specifically, the display board is made up of multiple display device or modules, each having multiple pixels. Each pixel in the display module is formed out of stacked light chromatic filters, whereby each of the filters can be manipulated and moved by use of a hydeomechanical or electro mechanical systems to form various shades of colors across the display board. Furthermore, each of the stacked filters forming each of pixels of the display device is coupled to a movable rod adapted to extend or retract each of the aforementioned filters. In so doing, the movement and positioning of the filters across the display module determines the color of each of the pixels displayed across the board. In certain embodiments of the present technique, movement of the rods, such as those coupled to the filters, is achieved through a hydroelectric mechanism formed of a liquid, such as an optical fluid or oil, disposed within each module. The object of such fluid is to facilitate an optical refraction matching medium having a proper index of refraction that closely matching the index of refraction between refracting and/or reflecting elements of the color device, as well as between interfaces separating the color device from its exterior. Such an optical fluid further acts as a lubricating and heat dissipating agent adapted to oil moving elements within the color device, as well as provide and even distribution of thermal effects created within the color device as a result of the various mechanical movements continuously occurring within the device. Further, the hydroelectric mechanism includes a hydroelectric pump used for thrusting and/or pulling the liquid so as to impart movement on the rods for moving the filters.

Further, each of the rods coupled to and used for moving the above filters can be individually controlled by a stopper and location feedback mechanism, attachable to each of the rods via, for example, grooves disposed thereon. Accordingly, the mechanical arm is adapted to maintain each of the filters in a desired position during movement of the fluid within the module, as may happen during refresh display operations. Thus, the disclosed hydroelectric mechanism can uniformly vary the position of each of the rods so that the filters can uniformly and smoothly move and vary corresponding filter color throughout the display device.

In addition, the display device or tile, as described above, may form or be an integral part of dynamic walls, mosaics, floors and/or other artistic array displayable in private or public settings, such as homes, museums, restaurants, bars and so forth.

In some embodiments of the present invention, the pixels in the display device may be arranged in an alternate pattern, so that each row of pixels may be shifted relative to an adjacent row. Additionally, the casing of the device may include a special shape having projections and depressions according to the pattern of said pixels, enabling the casings to fit one another without empty spaces in between.

Other aspects of the invention may include a system arranged to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
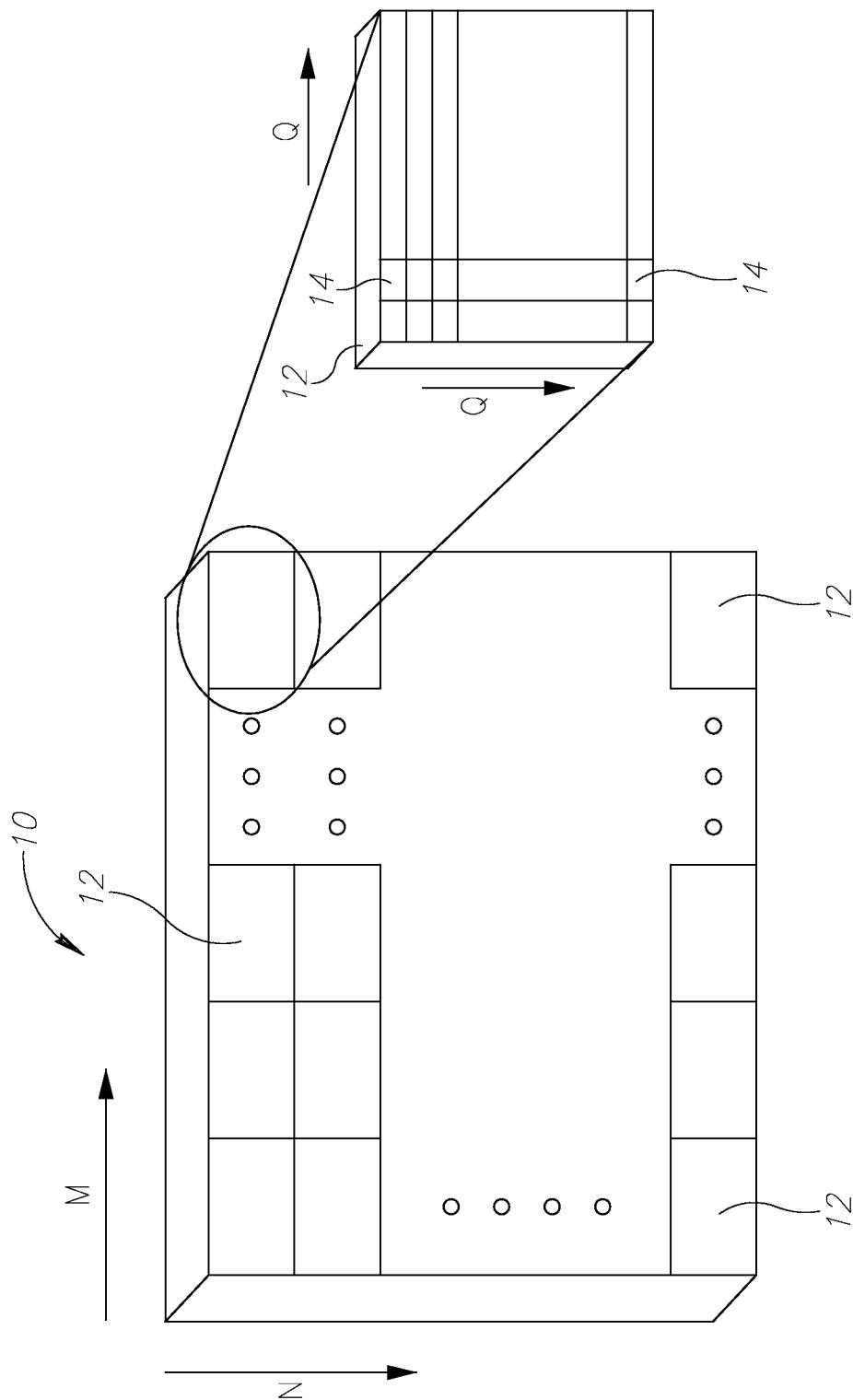
FIG. 1 is a perspective view of a color display board, in accordance with an exemplary embodiment of the present technique.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Embodiments of the present invention may provide a color device or tile that may dynamically display various images, texts and/or patterns, for examples upon billboards, advertisement boards, building walls, information boards etc.

Turning now to the figures, FIG. 1 is a perspective view of a display board 10, in accordance with an embodiment of the present technique. The display board 10 may generally form or be part of a large advertisement board, such as that used for displaying large images, normally used as part of a promotional campaign conducted by companies, stores, retailers and the like. Alternatively, the display board 10 may generally faun or be part of a building wall and may enable display and/or modification of patterns and textures upon the building's wall, and or display advertisements upon a building's wall, or form or be part of an information board. Hence, the display board 10 may show stationary images, moving images, or images that can be refreshed periodically. Furthermore, the images reflected and/or displayed by the board 10 may generally form colored images having various color, hues and/or intensities, similar to those displayed by ordinary devices, such as to printed posters. Thus, the display board may display an image encompassing an area large as billboard and/or other similar advertizing boards otherwise used for showing dynamic images and the like. The display board may form or be part of a mosaic, wall, floor or other artistic array having a capacity to display images.

Figure 2:
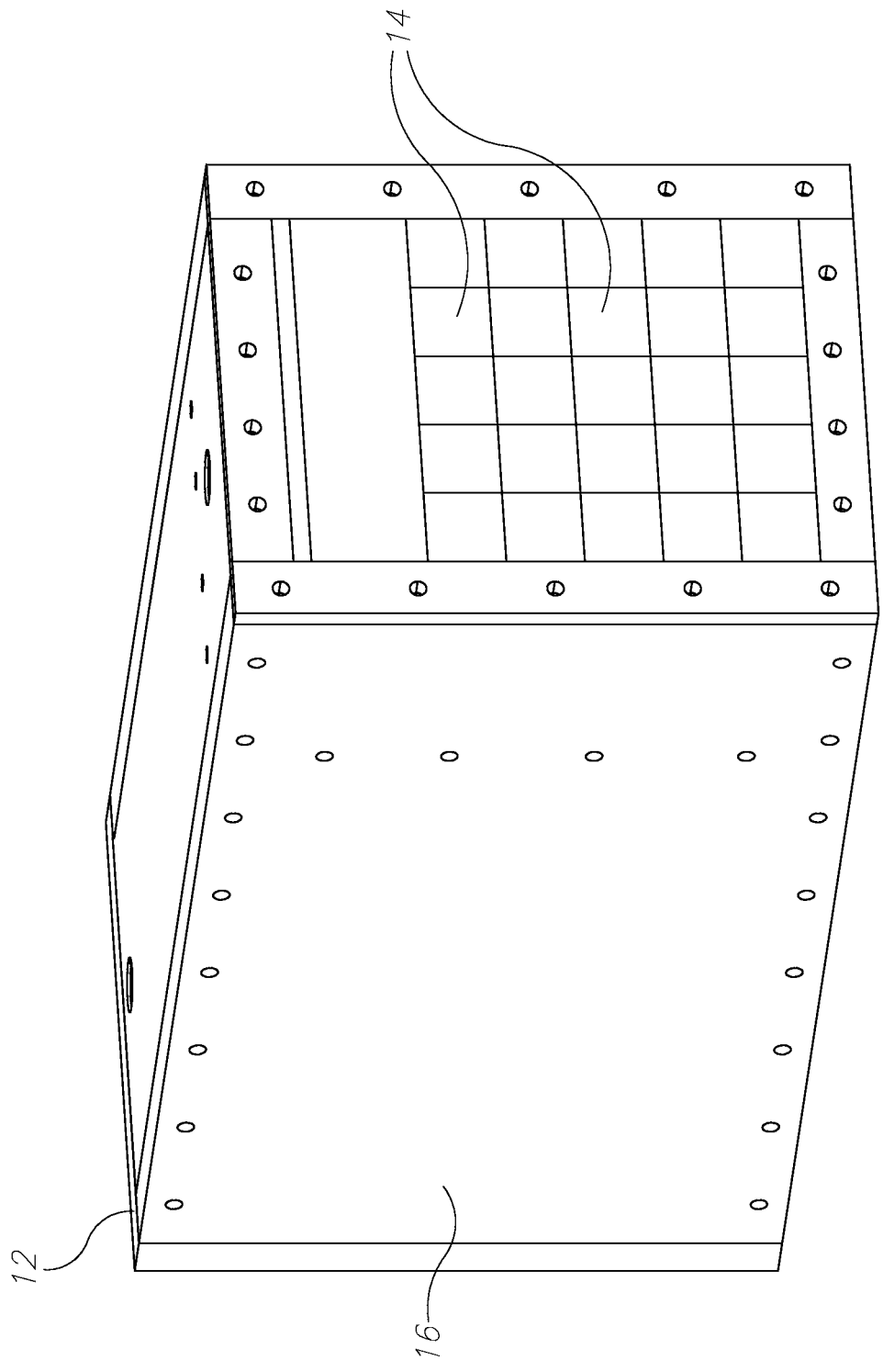
FIG. 2 is a perspective view of a color device forming the display board of FIG. 1, in accordance with an exemplary embodiment of the present technique.

Further, as illustrated by FIG. 2, the display board 10 is formed of individual display devices 12, whereby each of devices 12 is disposed adjacent to, on top of, or below to other display devices, such as the device 12. As further illustrated, the board 10 may be formed of M rows and N columns to form a matrix having M×N dimensions, whereby each cell of the matrix includes the display device 12. Hence, each board may include M×N display devices 12 or, in other words, each board can have a varying amount of display devices 12 depending on the amount of rows M and N columns chosen for the board 10 to incorporate.

Further, each of the display devices 12 includes a matrix of pixels 14, whereby each pixel is adapted to display a particular color ultimately forming an entire image formed across the board 10. Generally, the pixels 14 may have certain area dimensions, such as 2 centimeter (cm) by 2 cm, or 5 (cm) by 5 cm, nevertheless the display device 10 may accommodate pixels having other larger or smaller dimensions which could be varied in length and width as desired and/or in accordance with particular design or business implementations. Hence, in the illustrated embodiment, each of the display devices 12 can have Q rows and Q columns to form a square matrix of Q×Q (e.g., 5×5=25, or 4×5=20), while other embodiments of the present techniques may include a display device 12 having different sizes and varying amount of pixels within each of the display device 12.

It should be appreciated that a plurality of display devices 12 may fit seamlessly across the display board 10, so as to minimize any empty spaces existing between the devices 12. In so doing, the display board 10 achieves a maximal display coverage and utilization of the surface area encompassing the area of the display board 10. Additionally, the coverage ability of devices 12 is substantially full without blank regions or spaces between the pixels, thus enabling maximal or substantially full coverage of display board 10, substantially without blank regions or spaces.

As explained further below, in some embodiments of the present technique, the colors displayed by each of the pixels 14 may be formed by combining various light manipulating elements, such as chromatic filters having various pigments, colors, including but not limited to green, red, blue, while in other embodiments the color formed by each of the pixels may be yellow, cyan, magenta and/or other colors. The light manipulating elements may further include polarizers, reflective and/or refractive filters, and/or other optical elements adapted to form one or more pigments. As further shown below, each of the pixels 14 may also include a background, such as but not limited to a white, black, gray and/or other shades of backgrounds. In other embodiments, the background may include tile, generally disposed behind the other manipulating elements (e.g., chromatic filters), such that the background is adapted to reflect incoming light onto the various filters so as display the desired pigment for each pixel 14 within the board 10. Those skilled in the art will appreciate that the light impinging onto the board 10 may originate from natural sunlight or, alternatively, the light may originate from artificial light sources, such as projectors, fluorescents, other lamps, or other light sources disposed in the vicinity of the board 10.

As further illustrated, the display device 12 has a rectangular shape and is formed of a casing 16. While the present depiction illustrates the device and casing 16 as rectangular, it should be appreciated that the display device 12 and its casing 16 may be made up of other shapes and sizes such those including polygonal and/or curved contours and edges (see, for example, in FIG. 12). The casing 16 may be made out of a general metallic material, such as steel, aluminum, copper, tungsten, or a combination thereof, producing a relatively light, yet durable casing to the device 12. Alternatively, the casing 16 can be made from a composite material, such as one including various metals, or the casing can be made up of plastic. Further, the casing 16 is sealed all around for ensuring inner contents of the display device 12 remain well kept and secure within the casing 16. The casing 16 also servers to house a fluid, such as an optical fluid and/or other types of translucent lubricants, within the display device 12. Such fluids may be part of a hydraulic mechanism incorporated within the device 12, adapted for imparting motion on to mechanical components disposed within the casing 16 for moving the above-mentioned filters into place during operation of the board 10. The one or more fluids disposed within the device 12 may also be adapted to serve as an optical matching medium, providing an index of refraction interface between the exterior portions of the pixels 14 and the inner portion of the pixels. The fluids may also act as a lubricant and as a heat dissipating medium for minimizing friction between working mechanical elements of the device 12 while dissipating any heat resulting from any motion or operation of mechanical or other elements within the device 12.

Figure 3:
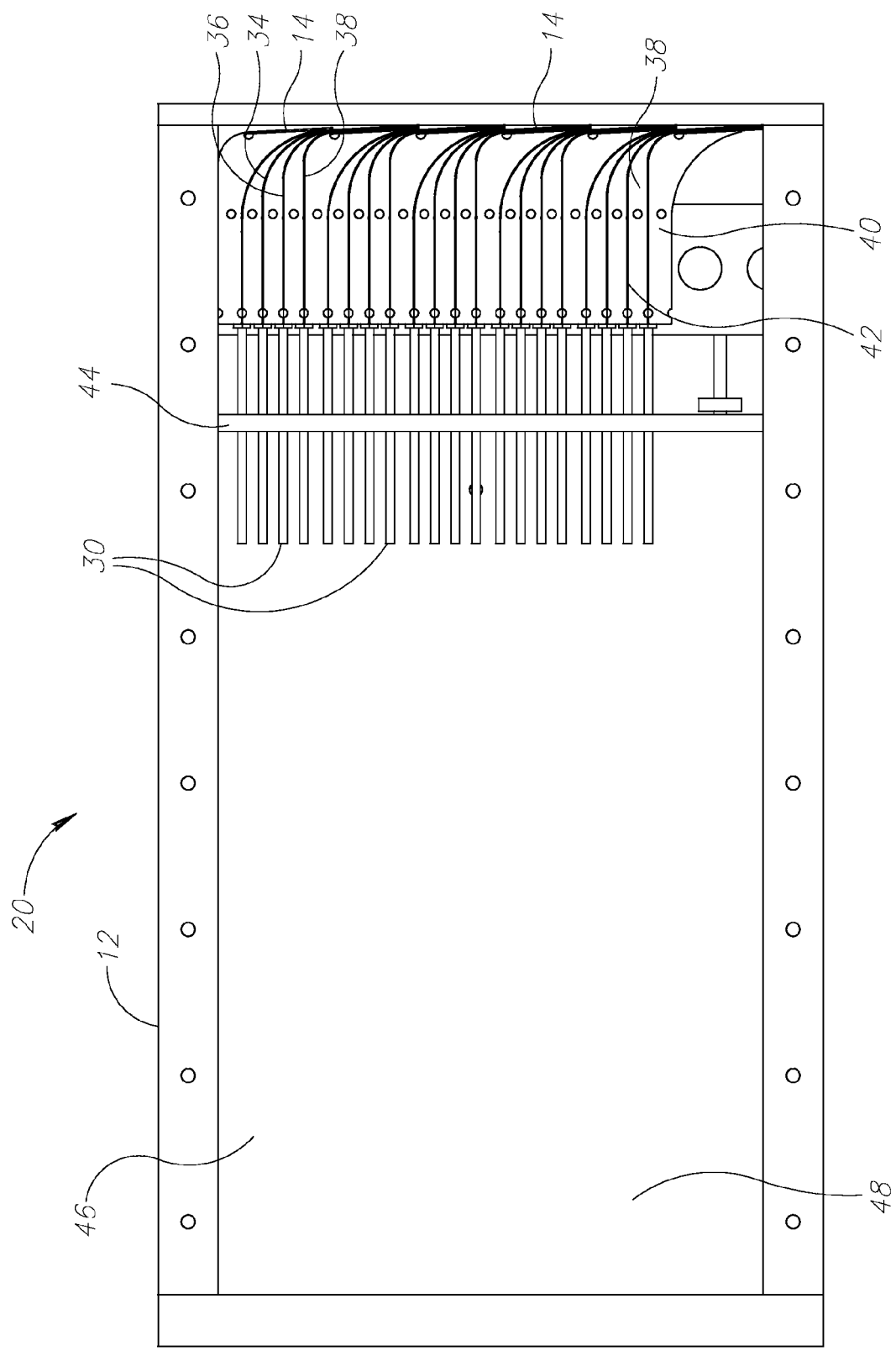
FIG. 3 is a side view of a color device, in accordance with an exemplary embodiment of the present technique.
Figure 4:
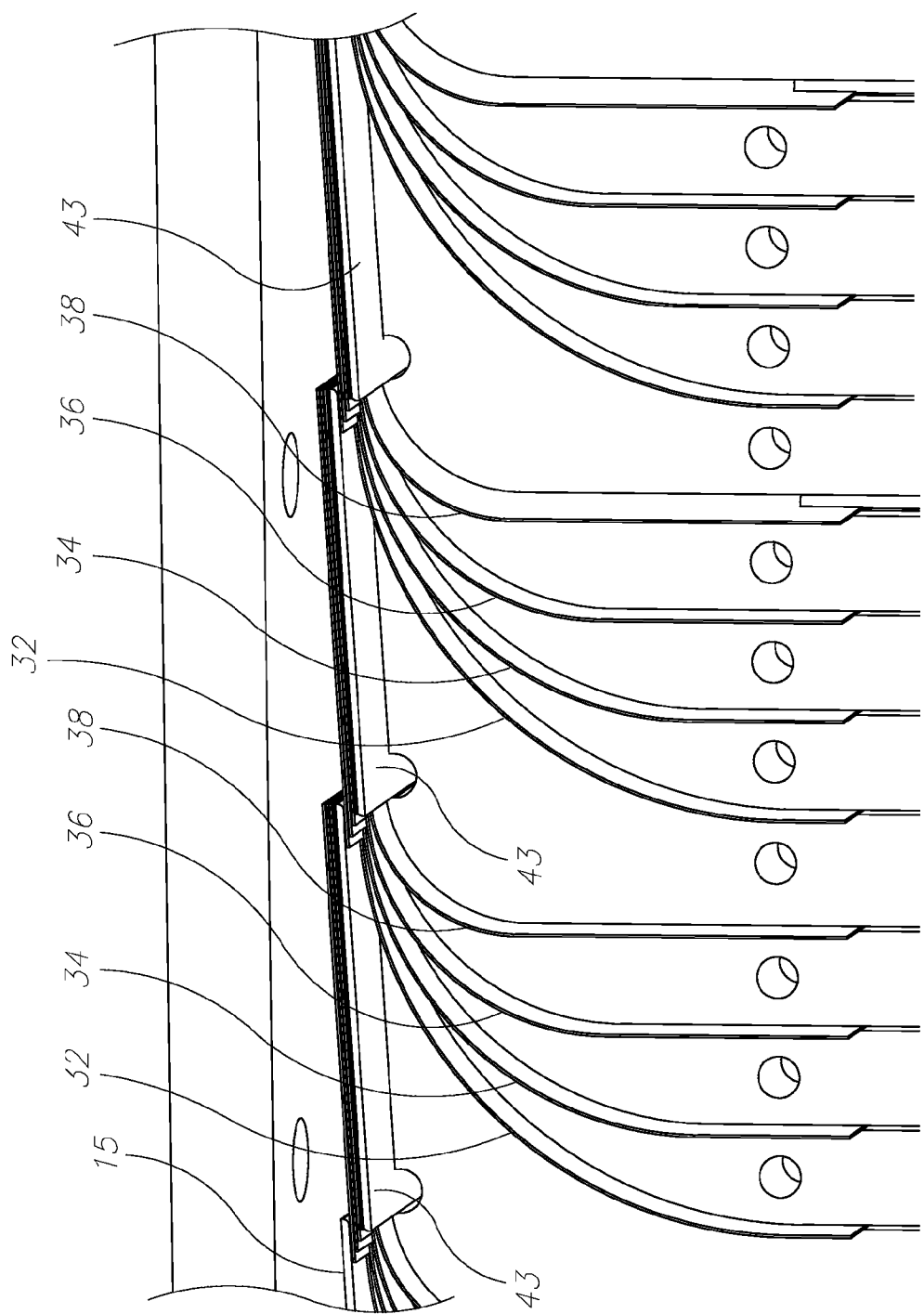
FIG. 4 is another side view of the color device illustrated in FIGS. 2 and 3, in accordance with an embodiment of the present technique.

FIG. 3 is a side view of a hydromechanical display device 12, in accordance with an exemplary embodiment of the present technique. FIG. 4 is another side view of the color device illustrated in FIGS. 2 and 3, in accordance with an embodiment of the present technique. As illustrated, the device 12 includes a plurality of rods 30, each of which is coupled to corresponding light manipulating elements 32, 34, 36 and 38, forming each of the pixels 14. The light manipulating elements 32-38 may form filters, reflectors, polarizers and/or other material adapted to interact with light for producing one or more pigments of various colors or shades. Accordingly, in an exemplary embodiment filters 32-38 may be formed of a translucent material having varying degrees of transparency, opaqueness, chromaticity, and/or pigmentation. As further illustrated by FIGS. 3 and 4, each of the filters 32-38 is disposed within channels formed in between members 40 and 42, disposed along a length of the display module 12. It should be born in mind that the present technique contemplates a varying number of light manipulating elements (e.g., filters) for each pixels and that while the present embodiment illustrates four filters per pixel, other modification of the present technique may utilize more or less filters per pixel.

Furthermore, the light manipulating elements/filters 32-38 extend from a front face, i.e., the face where pixels 14 are disposed, backwards to rods 30 to which the filters are coupled. As illustrated, with the aid of the channels formed by members 40 and 42, the filters 32-38 become bent towards the front end panel of the device 12. Thus, the members 40 and 42 ensure that the motion of the filters 32-38 along a side of the device 12 becomes transverse to the linear motion when the filters 32-38 move toward the front panel of the device 12.

As further shown by FIG. 4, the filters 32-38 form a stacked configuration placing, for example, the filter 32 at a most forward position relative to the other filter, while the filter 38 is placed at a most backward position relative to the other filters. As further shown, a background tile 43 (e.g., white, black, gray or any other color of choice) is disposed behind the filters 32-38 providing a reflective medium having a variety of colors or pigments for reflecting light onto the light manipulating elements/filters 32-38 so that those may collectively display a certain amount of colors to form a pixel of a desired color. Each of the background 43 and filters 32-38 are disposed at a slight angle relative to the face of the device 12 to from a series of overlapping and inter situated structures (similar to shingles disposed on a roof), adapted to optimally receive and/or reflect incoming light. Hence, in the illustrated embodiment, pixels 14 of the color device 12 are made up of a series of inter-situated structures disposed along the front panel of the device 12. Such a configuration ensures a rather efficient utilization for providing an optimal amount of pixels across the front panel of the display device 12.

Further, each of the rods 30 are individually coupled to the filters 32-38 through plate 44 adapted to ensure a proper positioning and alignment of the rods 30 with the filters 32-38. Accordingly, rods 30 are adapted to move, though actions of hydraulic pressure adapted to impart motion to the rods 30 and, consequently, move the filters 32-38 a desired distance, thereby providing a desired exposure for each of the filters to form each pixel 14. Accordingly, the color provide by each pixel 14 is determined by an amount of exposure each of the filters 32-38 attains between the front panel 15 and the background 43. In turn, the amount of exposure of each filter is determined by the amount of movement imparted to each of the rods 30 coupled to the filters 32-38. Hence, those skilled in the art will appreciate that such desired extension renders a desired color for each pixel in accordance with displayed images provided by the display device 12.

As further illustrated, the display module 12 includes an inner cavity 46 in which the aforementioned elements are disposed, in addition to other mechanical, electrical and/or hydraulic components are included. Accordingly, the cavity 46 is further adapted to contain a liquid, such as an optical fluid, used as part of a hydraulic mechanism for moving the rods 30 to their desired position. Again, the optical fluid contained within the cavity 46 provides an optical index of refraction matching medium between inner and outer optical interfaces separating the chromatic filters 32-38 from other surfaces, i.e., air, and portions exterior to the display device 12. The fluid also ensures smooth and continuous operations and movements of the rods 30, as well as, proper lubrication of various components included within the device 12. The fluid within the cavity 46 is further adapted to dissipate and/or equalize temperature gradients that could form within the cavity 46, while the rods 30 are moving, as well as, during the overall operation of the device 12. Further, to assist in moving the rods 30, the cavity 46 may include various contraptions, such as pistons, adapted thrust or pull the fluid contained within the cavity 46. In so doing, the piston 48 may impart motion onto the fluid which, in turn, causes the rods 30 to move forward or backwards, as may occur during display refresh operations and the like.

Figure 5:
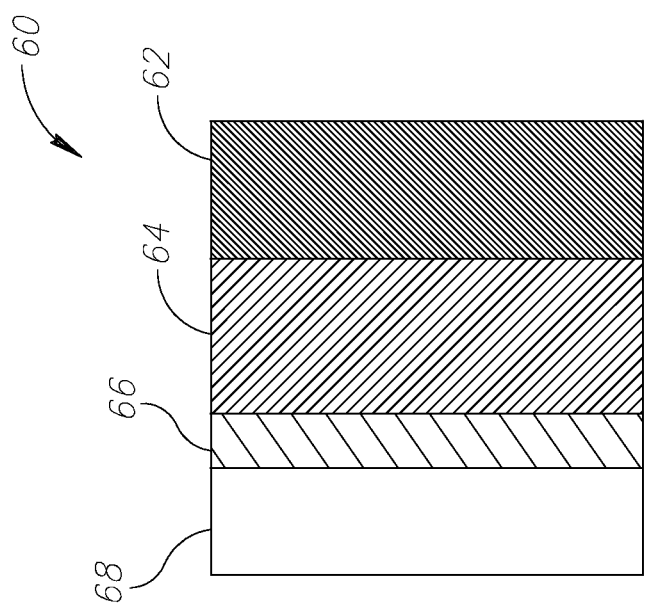
FIG. 5 is a top view of a color filter arrangement used in the color device, in accordance with an embodiment of the present technique.

FIG. 5 is a top view of a color filter arrangement 60 used by the color device 12, in accordance with an embodiment of the present technique. The arraignment 60 is made up of a combination of filters 62, 64, and 66, similar to the chromatic filters 32-38 described above with reference to FIGS. 2-4. In the illustrated exemplary embodiment, filter 62 may be colored black, filter 64 may be colored blue, and filter 66 may be colored yellow. It should be born in mind that the colored filters 62-66 and/or any combination thereof may attain any available color, displayable by the board 10, as described above. The arrangement 60 further includes a white background 68 disposed beneath the filters 62-66. The background 68 is situated beneath the filters 62-66, such that light reflected back from the background 68 can propagates to the filters, thereby displaying the desired color by their overlapping combination.

Figure 6:
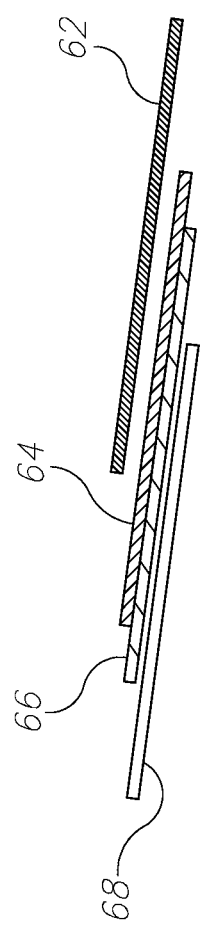
FIG. 6 is a side view of the color filter arrangement shown in FIG. 5, in accordance with an embodiment of the present technique.

As further illustrated by FIG. 6, in accordance with an exemplary embodiment of the present technique, the light manipulating elements/filters 62-66 and the background 68 are stacked in a parallel fashion one on top of the other and, at an angle, such that each of the filters 62-66 and/or the background 68 extends in length beyond the filters disposed above the aforementioned. Such stacking and arrangement of the filters 62-66 and background 68 better facilitates placement of the filters throughout the display device 12. It should be borne in mind that the stacking and placement of each of the light manipulating 62-66, as well as, background 68 can be automatically controlled so that the combination of all elements 62-68 gives rise to the desired pigment forming the pixel 14. Accordingly, the distance and coordinates of placing each of the elements 62-66 can optimally be manipulated via various computer algorithms and routines executed by one or more processors for ultimately controlling the pigments displayed by each of the pixels 14 throughout display device 12. In this regard, such software can overall map positions and pigments of the pixels 14 throughout the display device 12 and board 10 so as to form a logical and proper arrangement of dynamical viewable images of sceneries, objects, people, or any viewable real or virtual or animated element.

Figure 7:
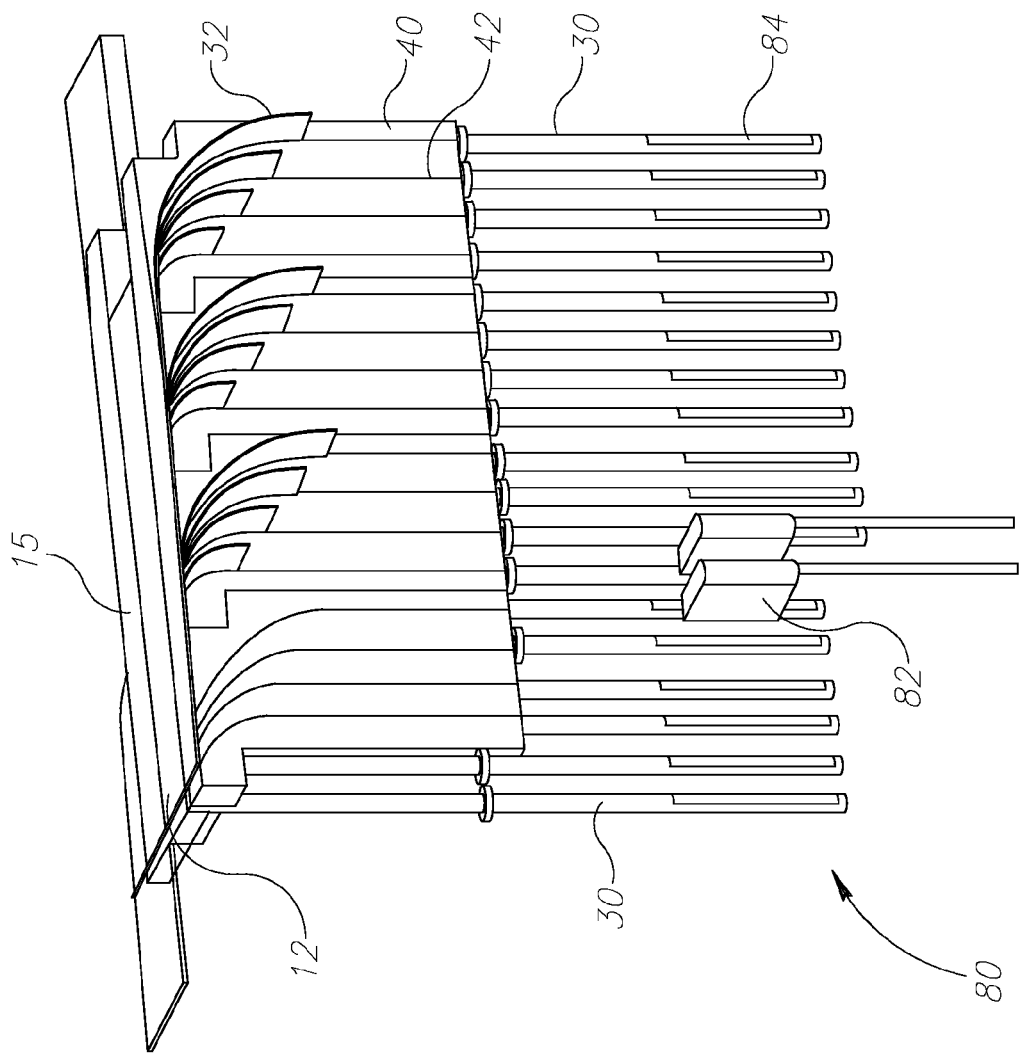
FIG. 7 is a perspective view of the color device illustrated by FIGS. 2-4, in accordance with an embodiment of the present technique.

FIG. 7 is a perspective view of a color device 80, in accordance with an embodiment of the present technique. The color device 80 is similar to the device 12 described and illustrated above with reference to FIGS. 2-4. As further illustrated, the device 80 includes a mechanism 82 adapted to regulate and monitor movement of the rods 30, as those place the chromatic filters, i.e., filters 32-38, into position, as part of the pixels 12 of the device 80 to form display board 10. The mechanism 80 may employ a variety of contraptions for halting movement of the rods and maintaining those in place while fluid pressures vary within the device 80. For example, in one embodiment, the mechanism 82 may latch onto grooves 84, engraved onto the rods 30, for maintaining the rods in place. It should be borne in mind that each rod 30 may have a corresponding latching mechanism 82 so that each rod can independently be moved or stopped in accordance with a desired positioning of each of the pixels 14. Accordingly, during refresh operations, that is, when the pixels 14 change color, the mechanism 82 enables each of the chromatic filters 32-38 to move into place so that the filters may be properly stacked to provide a desired color in accordance with the image displayed by the board 12.

The mechanism 82 may further include a measurement apparatus for determining the actual position of each of the rods 30 to further determine whether those rods are indeed maintained at the appropriate position relative to other rods in the board, as well as, relative to other static or dynamic indicator disposed within the color device 12.

Figure 8:
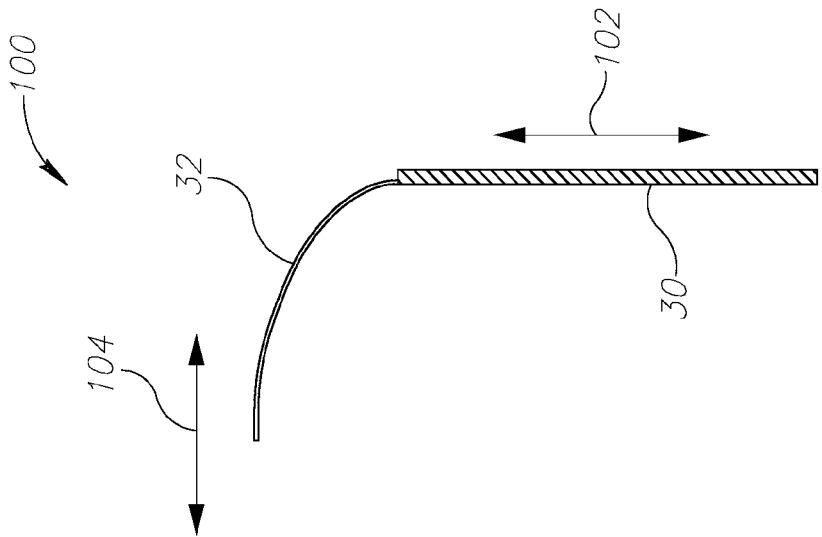
FIG. 8 is a side view of a rod mechanism used by the color system, in accordance with an embodiment of the present technique.

FIG. 8 is a side view of a rod mechanism 100 used by the color system, in accordance with an embodiment of the present technique. Accordingly, the rod mechanism 100 is made up of rod 30 and a filter, such as one of the filters 32-38, attached to the rod 30. The mechanism 100 is adapted to be disposed in between channels fanned of members 40 and 42, as illustrated by the above FIG. 3. Hence, the rod 30 is adapted to move, for example, the filters 32 between the members 40 and 42, as the chromatic filters bend at an angle, thereby ultimately moving flat across panel 15 (e.g., the front face of the display device 12) to form pixels 14 of the color device 12. In so doing, movement of the rods, as facilitated by members (40 and 42), transform the motion of the filters occurring in one plane, as indicated by arrow 102, into motion of the filters occurring in a plane that is oriented differently relative to the plane on which the rod 30 is moving, as indicated by arrow 104. In the illustrated embodiment arrows 102 and 104 are illustrated as being perpendicular to one another, thereby indicating that the motion of the filters 32-38 is transformed perpendicularly from one linear motion to another linear motion. Generally, other embodiments the movement of the filters may generally transform (under the actions of rods 30 and members 40 and 42) transversely between various planes for optimally aligning the filters 32-38 along the panel 15 of the color device 12.

Figure 9:
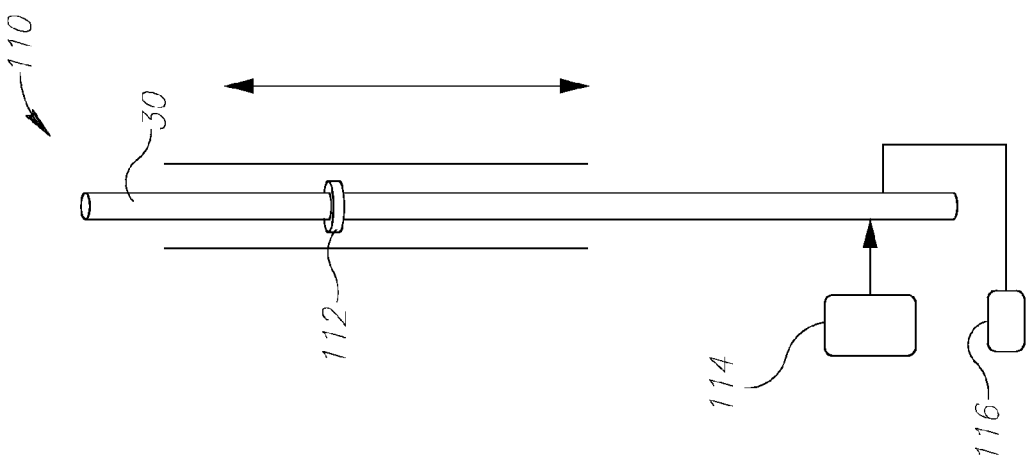
FIG. 9 is a schematic illustration of a movement system used by the color device, in accordance with an embodiment of the present technique.

As mentioned, in exemplary embodiments, movement of the rods 30 may generally be facilitated by using a hydraulic mechanism, whereby a fluid, i.e., optical fluid, applies certain hydraulic pressures within the device 12 for moving the rods 30 to their desired positions for achieving proper placements of the filters 32-38. Accordingly, FIG. 9 is a schematic illustration of a rod movement system 110 adapted to be used with a hydraulic implementation of the device 12.

As illustrated, the system 110 is formed of a rod, such as 30, adapted to be attached to one of the above-mentioned chromatic filters 32-38. Further, the system 110 is made up of a valve 112 disposed along the rod 30. Accordingly, the valve 112 facilitates the regulation of fluid flow and fluid pressure along the rod 30. The system 110 further includes a stopping mechanism 114, similar to the above described mechanism 82, adapted to halt the rod 30 in place and secure its position so that the chromatic filter attached thereto is also maintained in place. The stopping mechanism may employ a variety of devices, mechanical, electrical and/or other devices adapted to engage the rod 30 for securing its position. In one embodiment, mechanism 114 may be made up of a solenoid or other magnetic apparatus for latching onto the rod 30. In other embodiments, the mechanism 114 may include a mechanical groves and/or other complementary structural device adapted to latch onto the grooves 84, illustrated by the FIG. 7.

As further illustrated, the rod movement system includes a position measuring apparatus 116 adapted to measure the location of the rod 30, so as to ensure the chromatic filter, e.g., filters 32-28, attached to the rod is extended at a desired length, thereby providing a proper display of the pixel 14. The measuring apparatus 116 many include various electrical, optical and/or mechanical devices including but not limited to lasers, potentiometers, optical fibers, optical and electrical sensors and/or devices adapted to provide exact position measurements of the rod 30 within the device 12.

Figure 10:
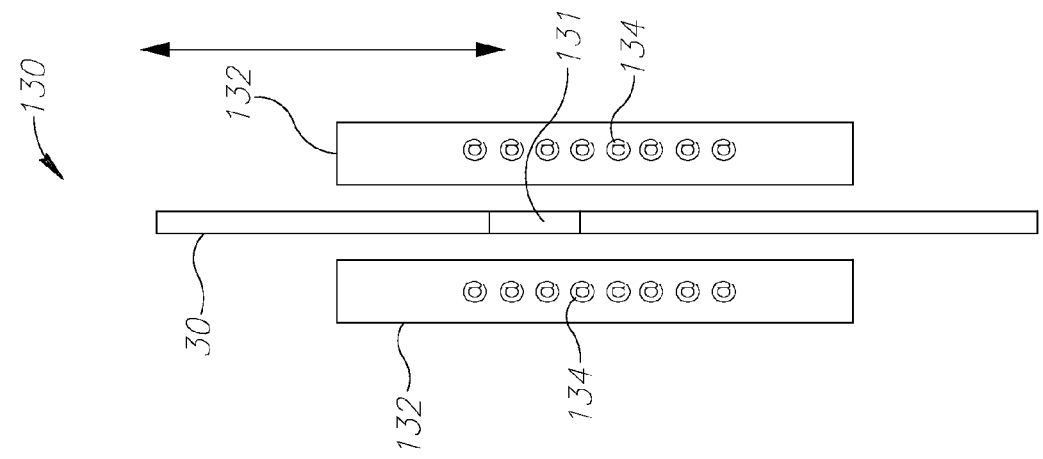
FIG. 10 is a schematic illustration of another movement system used by the color device, in accordance with an embodiment of the present technique.

FIG. 10 is a schematic illustration of another movement system 130 used by the color device, in accordance with an embodiment of the present technique. The system 130 is an electro-magnetic including the rod 30, further including a magnetic material 131 (e.g., ferromagnet). The system 130 further includes plates 132 disposed about the rod 30, specifically around the magnet 131. Each of the plates 132 includes solenoid coils 134, adapted for generating a magnetic field when powered with an electrical current. Accordingly, such a magnetic field is adapted interact with the magnetic material 131, thereby imparting motion onto the magnet 131 and the rod 30 to which the magnet is attached. Hence, the system 130 provides an electromagnetic system for moving the rods 30 into desired position, thereby ensuring the filters 32-38 may be properly positioned across the front face 15 of the device 12. Similarly, in other exemplary embodiments, one or more of the rods 30 may be coupled to a linear electric motor adapted to impart motion to the one or more rods 30, so as to move each of the rods 30 and, hence, each of the filters 32-38 and/or background 43 to a desired position to form the pixels 14 with a desired pigment.

Figure 11:
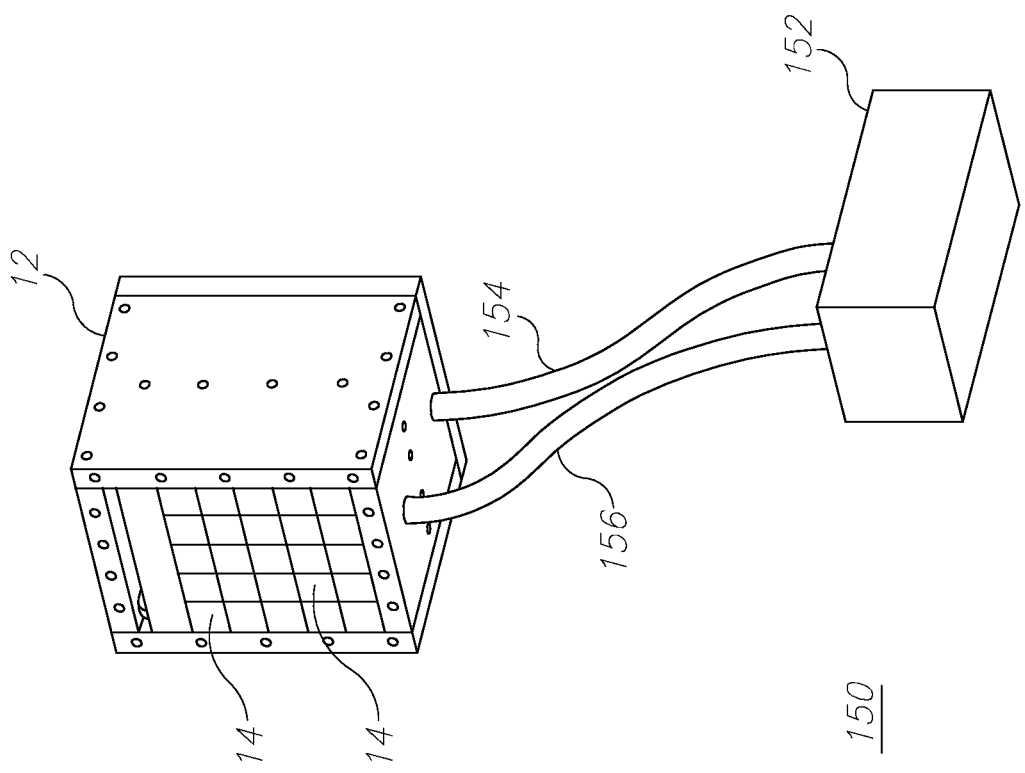
FIG. 11 is perspective view of a hydraulic system, in accordance with an embodiment of the present technique.

FIG. 11 is perspective view of a hydro-mechanical system 150, in accordance with an embodiment of the present technique. The system 150 is formed of the display device/module 12 coupled to hydroelectric pump 152 through tubes 154 and 156. Accordingly, the pump 152 is adapted to pump liquid, i.e., optical fluid, oil, etc., into and/or out from the module 12 for enabling motion of the rods 30 within the device 12. Hence the pump 152 may pump the optical fluid in periodic cycles or as dictated by refreshing operation for moving the rods 30 to the desired positions in properly fixing the filters 32-38 forming each pixel 14.

The pump 152 may further couple to multiple devices, such as the devices 12, for providing adequate liquid pressure in moving the multiple rods, as desired. Hence, the pump 152 may also couple to a control unit (not shown) adapted to control the general operation of the pump 152 for ensuring that the pump 152 maintains and outputs adequate liquid pressures to the devices to which it is coupled.

In some exemplary embodiments the device 152 may also include one or more computers, and the tubes 154 and 156 may include cables adapted to couple the computer to the device 12. Accordingly, the computer can be used to control the appearance of pixels 14 throughout the device 12. In so doing, the computer may control liquid pressure within the device, as well as the movement and placement of rods 30 within the device 12. In turn, such controlling operations may further determine the stacking and placement of light manipulating elements 32-38 and background 43, as described above.

In addition, the display device 12 and board may include various feedback mechanism adapted to ensure pixels 14, such as those forming images across the device 12 and board 10, are properly displayed. Such devices, for example, may include external cameras disposed adjacent to the board 10 or device 12, whereby the camera may externally and visually inspect pixels formed across the device 12 and board 10. Accordingly, the camera may be adapted to search and find certain image artifacts, such as those arising from an improper or misaligned placement and/or movement of the light manipulating elements 32-38 of background 43. Accordingly, such feedback may be used in real time to correct such artifacts so as to rectify and correct any detected artifacts within the image displayed by each of the devices 12 of the board 10.

Figure 12:
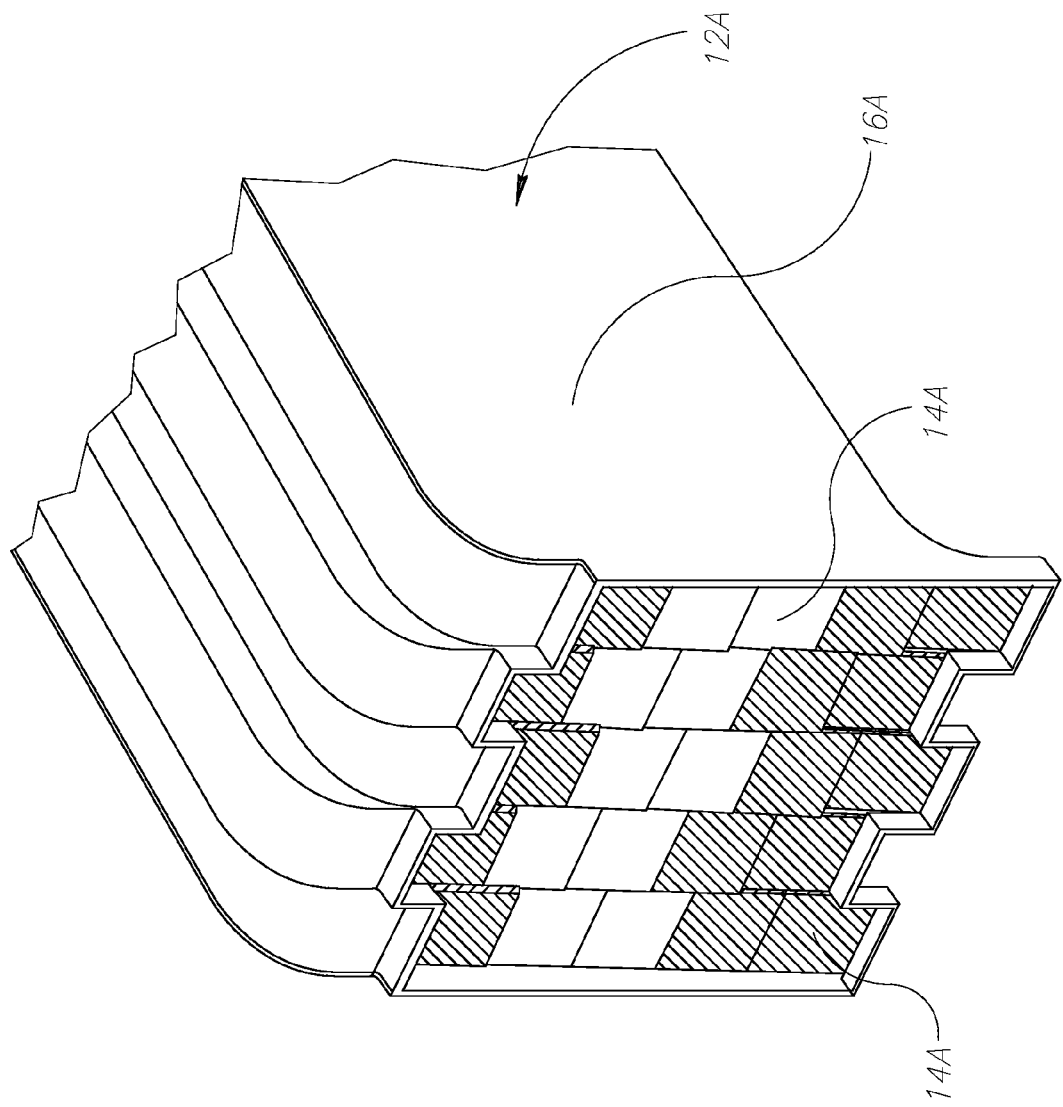
FIG. 12 is a perspective view of a color device in accordance with an exemplary embodiment of the present technique.

As explained above, it should be appreciated that the display device 12 and its casing 16 may be made up of other shapes and sizes such those including polygonal and/or curved contours and edges. Additionally, display device 12 may include various arrangements of pixels 14, for example in order to improve visual effects and/or quality of board 10. Reference is now made to FIG. 12, which is a schematic illustration of a device 12a similar in functioning to device 12 described above. Each of the display devices 12a may include a matrix of pixels 14a, similar to pixels 14 described above. however, as shown in FIG. 12, each row of pixels 14a may be slightly shifted relative to an adjacent row, for example in an alternate manner. An advantage of such arrangement may be that visual distortions such as aliasing may be prevented. For example, by creating a pixel pattern including a repetition with decreased frequency, the ability to perceive aliasing is much smaller.

It should be appreciated that a plurality of display devices 12a may fit seamlessly across a display board 10, so as to minimize any empty spaces existing between the devices 12a. In so doing, the display board 10 achieves a maximal display coverage and utilization of the surface area encompassing the area of the display board 10.

As further illustrated, accordingly to the alternate pattern of pixels 14a, display device 12a may have a casing 16a with a special shape having alternate projections and depressions. The shape of casing 16a may be such that enables casings 16a to fit one another without empty spaces in between.

Additionally, the coverage ability of devices 12a is substantially full without blank regions or spaces between pixels 14a, thus enabling maximal or substantially full coverage of display board 10, substantially without blank regions or spaces.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A display device, comprising:
   a pixel comprising:
      a front face;
      a plurality of bendable light manipulating elements, arranged to be pushed toward said front face and to bend behind said front face, so as to overlap a portion of an area of said front face;
      a plurality of rods, each one of the rods coupled to one of said bendable light manipulating elements; and
      a rod movement system arranged to control motion of each one of said rods toward said front face, thereby causing a bending of said bendable light manipulating elements controlling said portion of said area of said front face by which said one of said bendable light manipulating elements coupled to said rod overlaps said area of said front face.

2. The display device according to claim 1 wherein said plurality of bendable light manipulating elements are arranged to bend behind said front face, forming a stack of light manipulating elements behind said front face.

3. The display device according to claim 2 wherein an extent of overlap of each one of said light manipulating elements with an area of said front face determines a color of said pixel.

4. The display device according to claim 1 wherein at least one of said light manipulating elements comprises a pigment which determined a color of said light manipulating element.

5. The display device according to claim 1 wherein said pixel comprises a shape so that a plurality of said pixels achieve a substantially full coverage of a front face of the display device when a plurality of said pixels are placed next to each other.

6. The display device according to claim 1 wherein said pixel comprises a shape so that a plurality of said pixels overlap each other when a plurality of said pixels are placed next to each other.

7. The display device according to claim 1 and further comprising an optical fluid disposed within said pixel, wherein said optical fluid is adapted to provide an index of refraction for matching an index of refraction of said front face of the pixel and of at least one of said light manipulating elements in order to reduce internal reflection and increase visibility of said at least one light manipulating element.

8. The display device according to claim 1 and further comprising a background tile behind the front face.

9. The display device according to claim 1 wherein said light manipulating elements are arranged to be capable of overlapping with an entire area of said front face.

10. The display device according to claim 1 wherein at least one of said light manipulating elements comprises a chromatic filter.

11. The display device according to claim 1 wherein said rod movement system comprises a position measuring device and a stopping mechanism.

12. The display device according to claim 1, wherein at least one of the rods is adapted to move through an action of a magnetic field produced in proximity to the at least one rod.

13. The display device according to claim 1, further comprising a hydraulic pump configured to apply a same pressure of a hydraulic liquid to said plurality of rods for moving said plurality of rods to positions which are predefined for each rod respectively.

14. The display device according to claim 13, wherein at least one of said rods is adapted to move through an action of pressure variations of said hydraulic liquid within said display device.

15. The display device according to claim 14, wherein said at least one of said rods is associated with a stopper configured to stop a motion of said rod at a predefined position.

16. The display device according to claim 13 wherein said hydraulic liquid comprises an optical fluid disposed within said pixel, wherein said optical fluid is adapted to provide an index of refraction for matching an index of refraction of said front face of the pixel and of at least one of said light manipulating elements.

17. The display device according to claim 1, wherein each one of the light manipulating elements comprises a light manipulating element selected from a group consisting of:
    a chromatic filter;
    a tile;
    a polarizer;
    a light reflector; and
    a combination of at least two of the above.

18. The display device according to claim 1, wherein each one of the light manipulating elements comprises a chromatic filter comprising a pigment selected from a group consisting of:
    a red pigment;
    a green pigment;
    a blue pigment;
    a yellow pigment;
    a magenta pigment; and
    a cyan pigment.

19. The display device according to claim 1 wherein said display device comprises a casing comprising a plurality of pixels.

20. The display device according to claim 19 wherein said casing comprises at least one projection and at least one corresponding depression, arranged so that said projection protrudes into said depression and said casings achieve a substantially full coverage of a front face of the display device when a plurality of said casings are stacked next to each other.

21. The display device according to claim 19 wherein said display device comprises a board comprising a plurality of casings.

22. A method of displaying a colored display comprising:
    providing a pixel comprising:
    a front face;
        a plurality of bendable light manipulating elements, arranged to be pushed toward said front face and to bend behind said front face, so as to overlap a portion of an area of said front face;
        a plurality of rods, each one of the rods coupled to one of said bendable light manipulating elements; and
        a rod movement system arranged to control motion of each one of said rods toward said front face, thereby causing a bending of said bendable light manipulating elements controlling said portion of said area of said front face by which said one of said bendable light manipulating elements coupled to said rod overlaps said area of said front face;
    placing said pixel in a display setting; and
    bending said plurality of bendable light manipulating elements behind said front face to an extent of overlap of each one of said light manipulating elements with an area of said front face in order to determine a color of said pixel.

23. The method according to claim 22 and further comprising using an optical fluid disposed within said pixel, wherein said optical fluid is adapted to provide an index of refraction for matching an index of refraction of said front face of the pixel and of at least one of said light manipulating elements in order to reduce internal reflection and increase visibility of said at least one light manipulating element.

24. The method according to claim 22, further comprising using a hydraulic pump configured to apply a same pressure of a hydraulic liquid to said plurality of rods for moving said plurality of rods to positions which are predefined for each rod respectively.

25. The method according to claim 24 wherein said hydraulic liquid comprises an optical fluid disposed within said pixel, wherein said optical fluid is adapted to provide an index of refraction for matching an index of refraction of said front face of the pixel and of at least one of said light manipulating elements in order to reduce internal reflection and increase visibility of said at least one light manipulating element.

* * * * *